(12) United States Patent
Smith

(10) Patent No.: US 8,342,787 B2
(45) Date of Patent: Jan. 1, 2013

(54) FAST-ACTING COLLAPSIBLE FASTENER

(75) Inventor: Dwight Smith, Bedford, VA (US)

(73) Assignee: Zipnut Technology, LLC, Falls Church, VA (US)

( * ) Notice: Subject to any disclaimer, the term of this patent is extended or adjusted under 35 U.S.C. 154(b) by 411 days.

(21) Appl. No.: 12/616,221

(22) Filed: Nov. 11, 2009

(65) Prior Publication Data

US 2011/0110746 A1    May 12, 2011

(51) Int. Cl.
 *F16B 35/02* (2006.01)
(52) U.S. Cl. ......................................... 411/383; 411/354
(58) Field of Classification Search .................... 411/71, 411/74, 80, 356–358, 271, 325, 347, 383; 70/229, 230
 See application file for complete search history.

(56) References Cited

U.S. PATENT DOCUMENTS

| | | | |
|---|---|---|---|
| 3,042,094 A * | 7/1962 | Liljeberg | 411/271 |
| 4,066,282 A * | 1/1978 | Vann | 285/39 |
| 4,378,187 A | 3/1983 | Fullerton | |
| 5,139,381 A | 8/1992 | Lubreski et al. | |
| 5,324,150 A | 6/1994 | Fullerton | |
| 5,378,100 A | 1/1995 | Fullerton | |
| 5,427,488 A | 6/1995 | Fullerton et al. | |
| 5,580,200 A | 12/1996 | Fullerton | |
| 5,613,816 A * | 3/1997 | Cabahug | 411/433 |
| 5,634,754 A * | 6/1997 | Weddendorf | 411/354 |
| 5,649,723 A * | 7/1997 | Larsson | 285/34 |
| 5,733,084 A * | 3/1998 | Fullerton | 411/267 |
| 5,788,443 A * | 8/1998 | Cabahug | 411/385 |
| 5,800,108 A * | 9/1998 | Cabahug | 411/433 |
| 5,902,085 A | 5/1999 | Yuta | |
| 5,996,654 A * | 12/1999 | Green | 141/383 |
| 6,200,081 B1 * | 3/2001 | Ferrari et al. | 411/80 |
| 6,406,240 B1 | 6/2002 | Potter | |
| 6,712,574 B1 * | 3/2004 | Roopnarine | 411/433 |
| 6,974,291 B2 | 12/2005 | Li | |
| 2007/0286702 A1 | 12/2007 | Smith | |
| 2009/0324364 A1 | 12/2009 | Smith | |
| 2010/0158635 A1 | 6/2010 | Rodman | |

* cited by examiner

*Primary Examiner* — Gary Estremsky
(74) *Attorney, Agent, or Firm* — Michael Best & Friedrich LLP

(57) ABSTRACT

A threaded fastener includes an outer body defining an axis and an inner body at least partially positioned within the outer body. The inner body is movable along the axis relative to the outer body. A plurality of threaded segments is coupled to the outer body and radially supported by the inner body. The plurality of threaded segments defines a nominal diameter. At least one biasing member biases the plurality of threaded segments inward toward the axis. The plurality of threaded segments is movable inward toward the axis by the at least one biasing member when the inner body is moved axially from a first position to a second position so that the plurality of threaded segments define a reduced diameter that is smaller than the nominal diameter.

17 Claims, 12 Drawing Sheets

FAST-ACTING COLLAPSIBLE FASTENER

BACKGROUND

The present invention relates to threaded fasteners. More particularly, the invention relates to a threaded fastener having a plurality of threaded segments that are collapsible from a first diameter to a second, smaller diameter.

SUMMARY

In one aspect, the invention provides a threaded fastener including an outer body defining an axis and an inner body at least partially positioned within the outer body. The inner body is movable along the axis relative to the outer body. A plurality of threaded segments is coupled to the outer body and radially supported by the inner body. The plurality of threaded segments defines a nominal diameter. At least one biasing member biases the plurality of threaded segments inward toward the axis. The plurality of threaded segments is movable inward toward the axis by the at least one biasing member when the inner body is moved axially from a first position to a second position so that the plurality of threaded segments define a reduced diameter that is smaller than the nominal diameter.

In another aspect, the invention provides a threaded fastener including a plurality of threaded segments defining an axis and a nominal diameter measured perpendicular to the axis. The plurality of threaded segments is radially retractable to selectively decrease the effective outer diameter of the threaded fastener from the nominal diameter to a reduced diameter that is smaller than the nominal diameter. A blocking feature is movable between a blocking position in which the blocking feature blocks the retraction of the plurality of threaded segments and a non-blocking position which allows the retraction of the plurality of threaded segments.

In yet another aspect, the invention provides a method of operating a threaded fastener with retractable threaded segments. A plurality of radially retractable threaded segments is provided to selectively decrease the effective outer diameter of the threaded fastener from a first diameter to a second diameter. The plurality of radially retractable threaded segments is biased in a radially inward direction by at least one radial biasing member. The plurality of threaded segments is radially supported with an inner body so that the plurality of threaded segments defines the first diameter with the inner body in a first position. The inner body is axially moved relative to the plurality of threaded segments from the first position to a second position, whereby the plurality of threaded segments are retracted by the at least one radial biasing member to define the second diameter.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
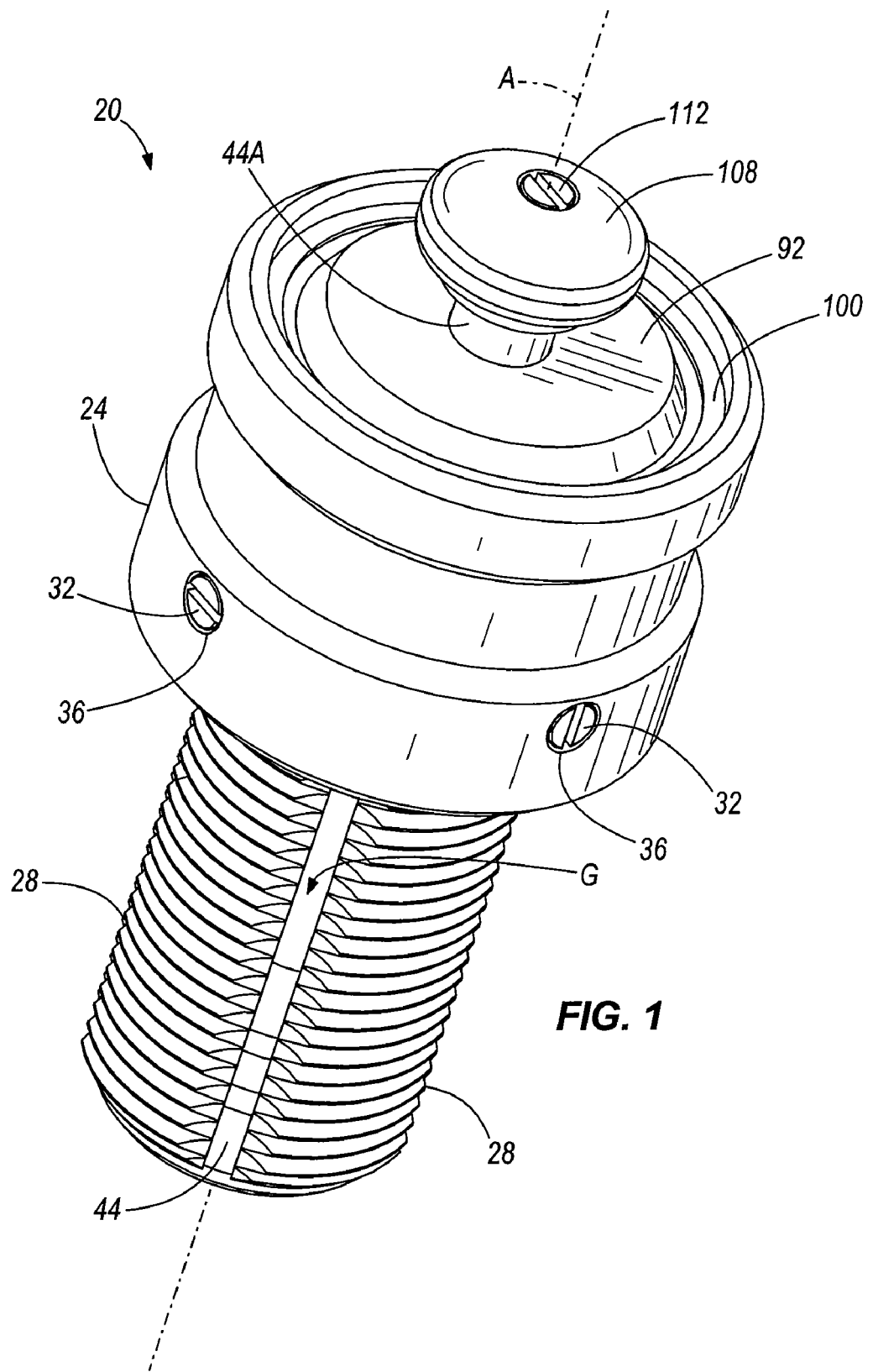
FIG. 1 is a perspective view of a threaded fastener according to one construction of the present invention.
Figure 2:
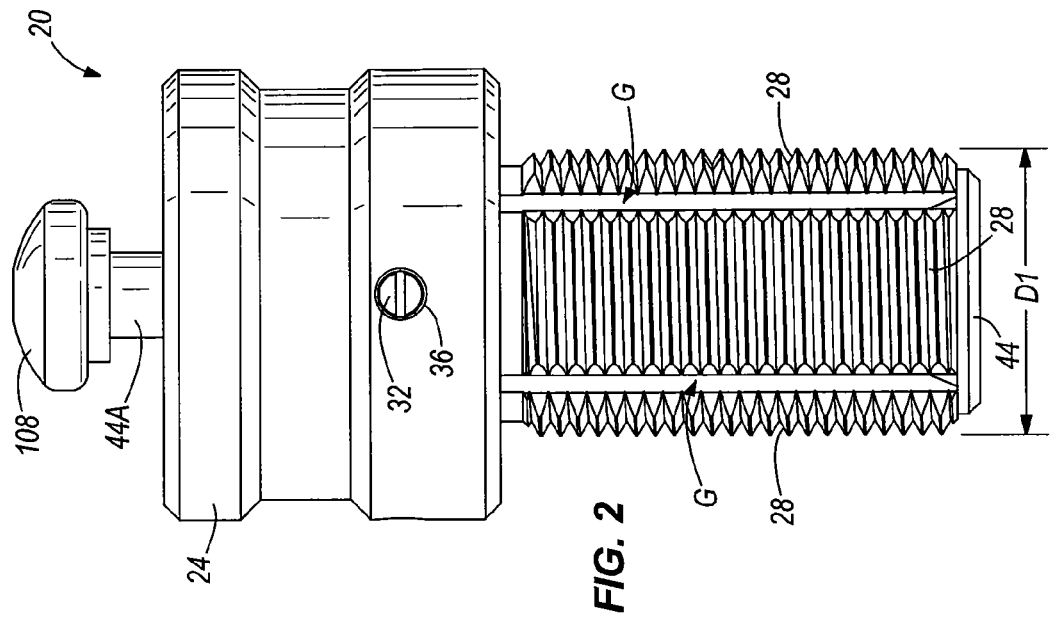
FIG. 2 is a front view of the threaded fastener of FIG. 1.
Figure 3:
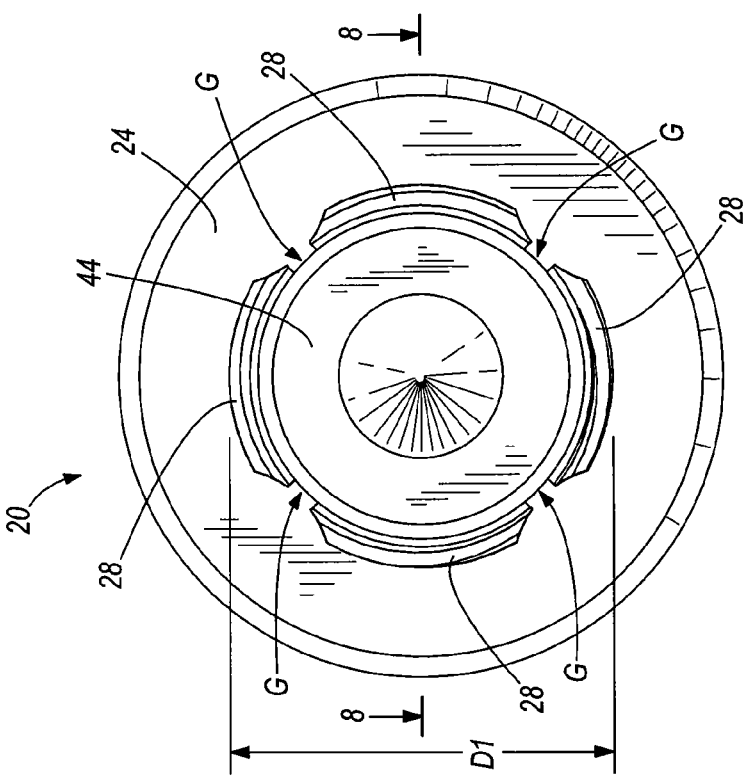
FIG. 3 is a bottom view of the threaded fastener of FIG. 1.

FIGS. 1-10B illustrate a threaded fastener 20 defining an axis A. Although the fastener 20 is illustrated as a bolt having a particular thread configuration and particular relative dimensions, the features described below are applicable to many different constructions of male threaded fasteners having different lengths, length-to-diameter ratios, thread configurations, etc. The fastener 20 includes an outer body 24 that provides a head portion and a plurality of threaded segments 28 that provide a threaded portion. The illustrated fastener 20 includes four threaded segments 28, each of which provides about one-fourth of the total threads of the fastener 20. As shown in FIGS. 1-3, small gaps extending substantially parallel with the axis A divide the threaded segments 28 from each other.

The illustrated fastener 20 is a large size fastener, having a nominal diameter D1 of 1.875 inches at the threaded portion, although fasteners of other sizes may utilize the features illustrated in the figures and described below. Because the threaded portion of the fastener 20 is split into independent segments 28, the threaded portion can be collapsed, by radially retracting all of the plurality of threaded segments 28 toward the axis A, so that the fastener 20 defines a second diameter D2 at the threaded portion that is smaller than the nominal diameter D1. The second or collapsed diameter D2 is small enough that the threaded portion of the fastener 20 can pass freely through a nut or other type of threaded aperture that corresponds to and engages with the threaded segments 28 when the threaded portion assumes the nominal diameter D1. Although using four threaded segments 28 is desirable in many circumstances and feasible for use with many sizes of fasteners, it is not required, and the fastener 20 may be provided with more or fewer than four threaded segments 28 in other constructions.

It should be noted that the dimension D2 is measured across the nearly-circular retracted threaded segments 28 in the same manner as one would typically measure a diameter, and is thus referred to as a diameter, although it will be appreciated that the threaded segments 28 only define a truly circular shape when expanded to the nominal diameter D1. The second diameter D2 may be considered as the greatest measurable distance across the threaded portion, perpendicular to the axis A, when the threaded segments 28 are fully retracted. A dimension measured this way may also be considered an "effective diameter" since the shape is so close to a true circle and since this dimension, regardless of true shape, will determine what size hole is required for clearance.

Each of the plurality of threaded segments 28 is coupled to the outer body 24 with a fastener such as a pin 32. Each pin 32 is partially threaded so as to screw into a corresponding threaded aperture 36 in the outer body 24. However, the distal end portion of each pin 32, which engages the respective threaded segment 28, is not threaded. The threaded segments 28 are provided with clearance holes 40 to receive the distal end portions of the respective pins 32. The pins 32 couple the plurality of threaded segments 28 to the outer body 24 such that the plurality of threaded segments 28 are rotatable with the outer body 24 (i.e., the pins 32 are torque transmitting members which inhibit relative rotation about the axis A between the outer body 24 and the threaded segments 28). The clearance between the pins 32 and the respective clearance holes 40 allows the threaded segments 28 to slide on the pins 32 when the fastener 20 is actuated to retract the threaded segments 28 from the nominal position (FIGS. 1-3) to the retracted or collapsed position (FIGS. 5-7), and vice versa. In the illustrated construction, a single pin 32 couples each of the threaded segments 28 to the outer body 24, but more than one pin 32 per threaded segment 28 may be used.

Figure 4:
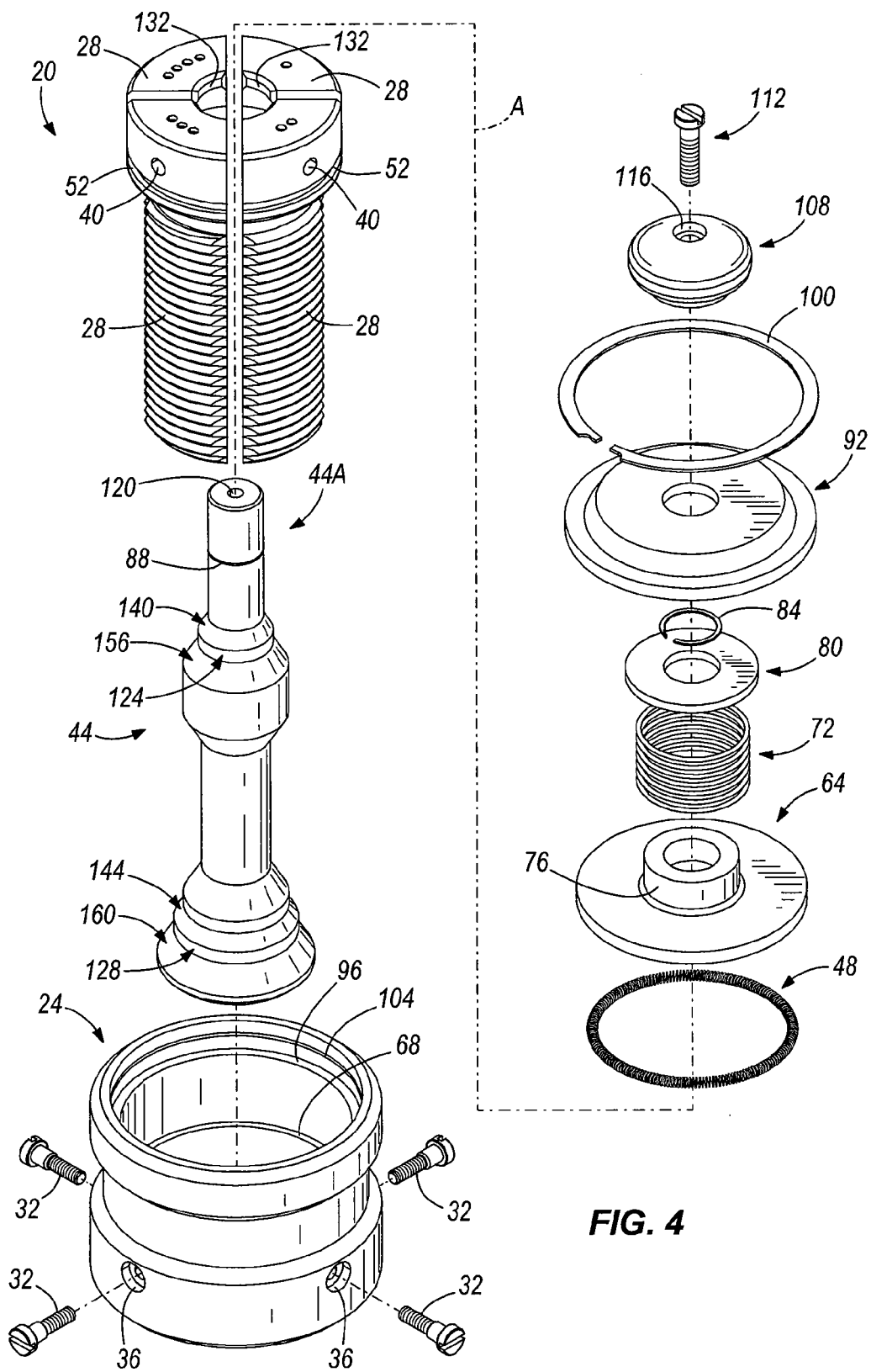
FIG. 4 is an exploded assembly view of the threaded fastener of FIG. 1.
Figure 5:
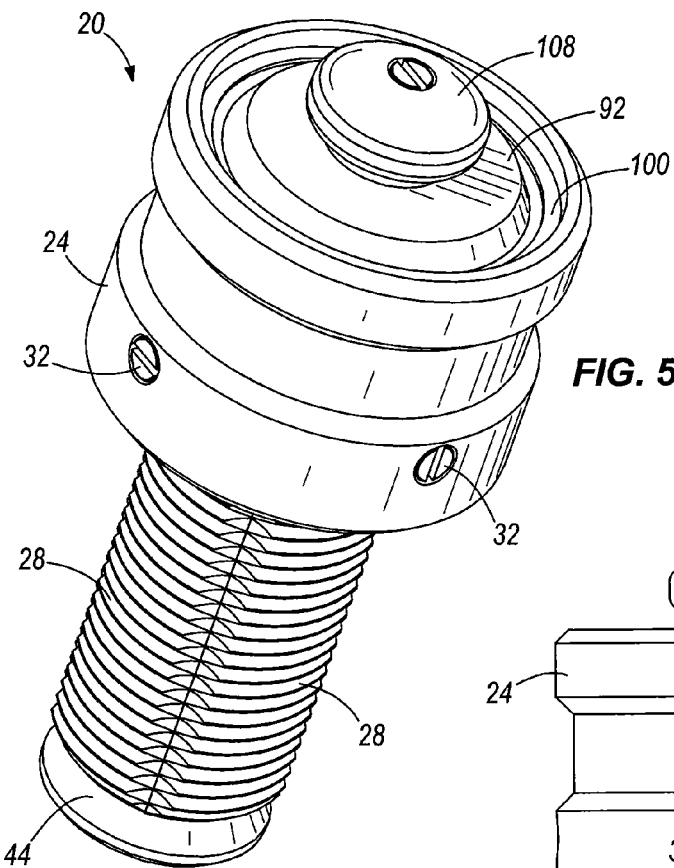
FIG. 5 is a perspective view of the threaded fastener of FIG. 1 in a second, collapsed condition.
Figure 6:
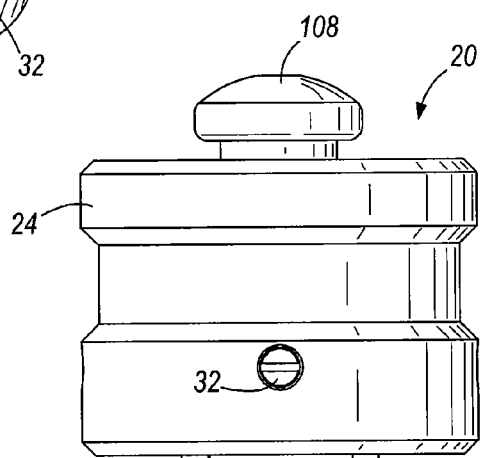
FIG. 6 is a front view of the threaded fastener of FIG. 1 in a second, collapsed condition.
Figure 7:
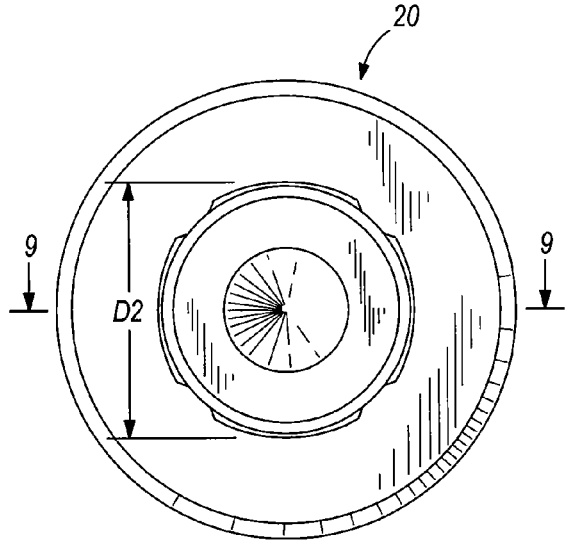
FIG. 7 is a bottom view of the threaded fastener of FIG. 1 in a second, collapsed condition.
Figure 8:
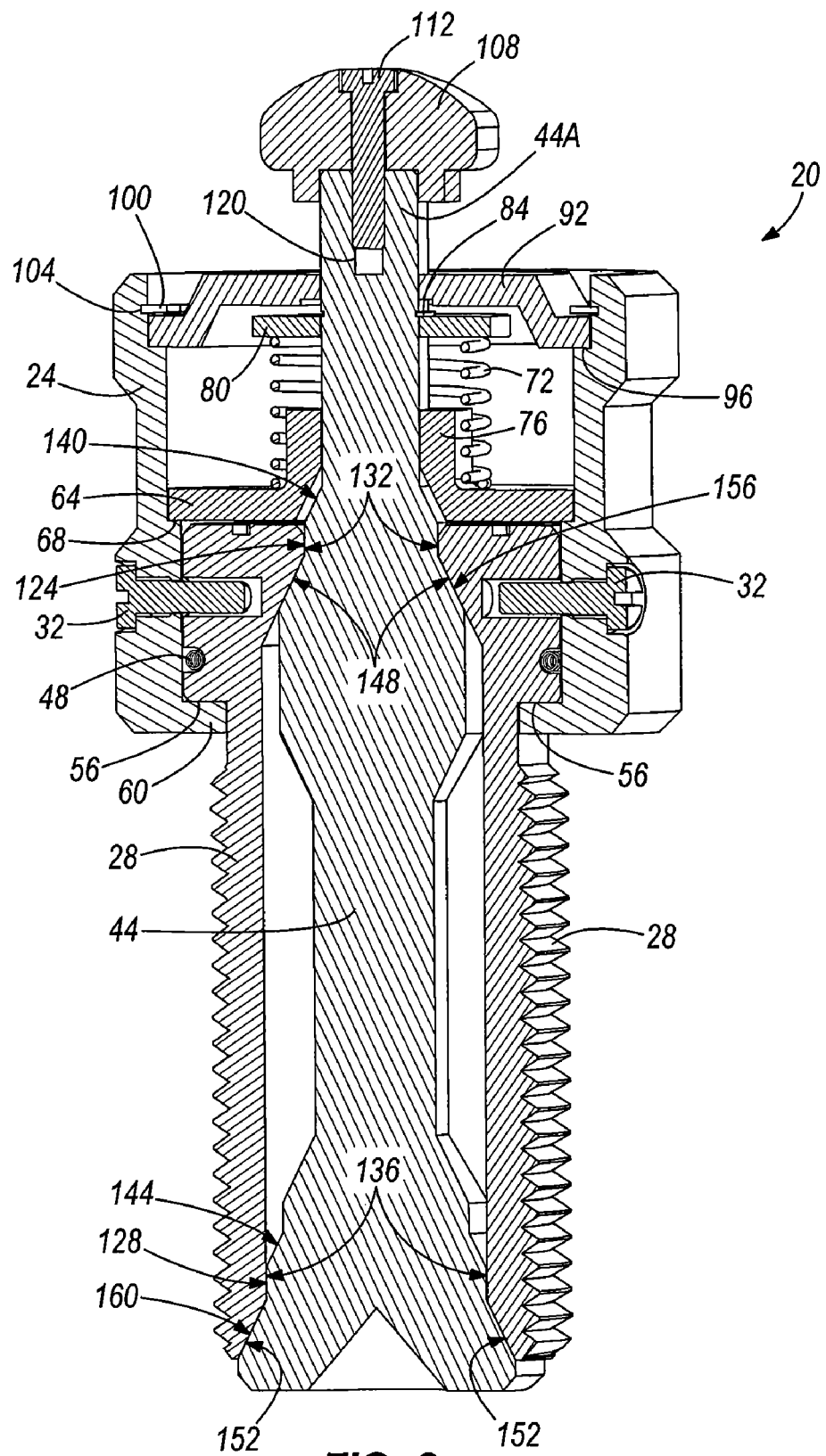
FIG. 8 is a cross-sectional view of the threaded fastener, taken along line 8-8 of FIG. 3.
Figure 9:
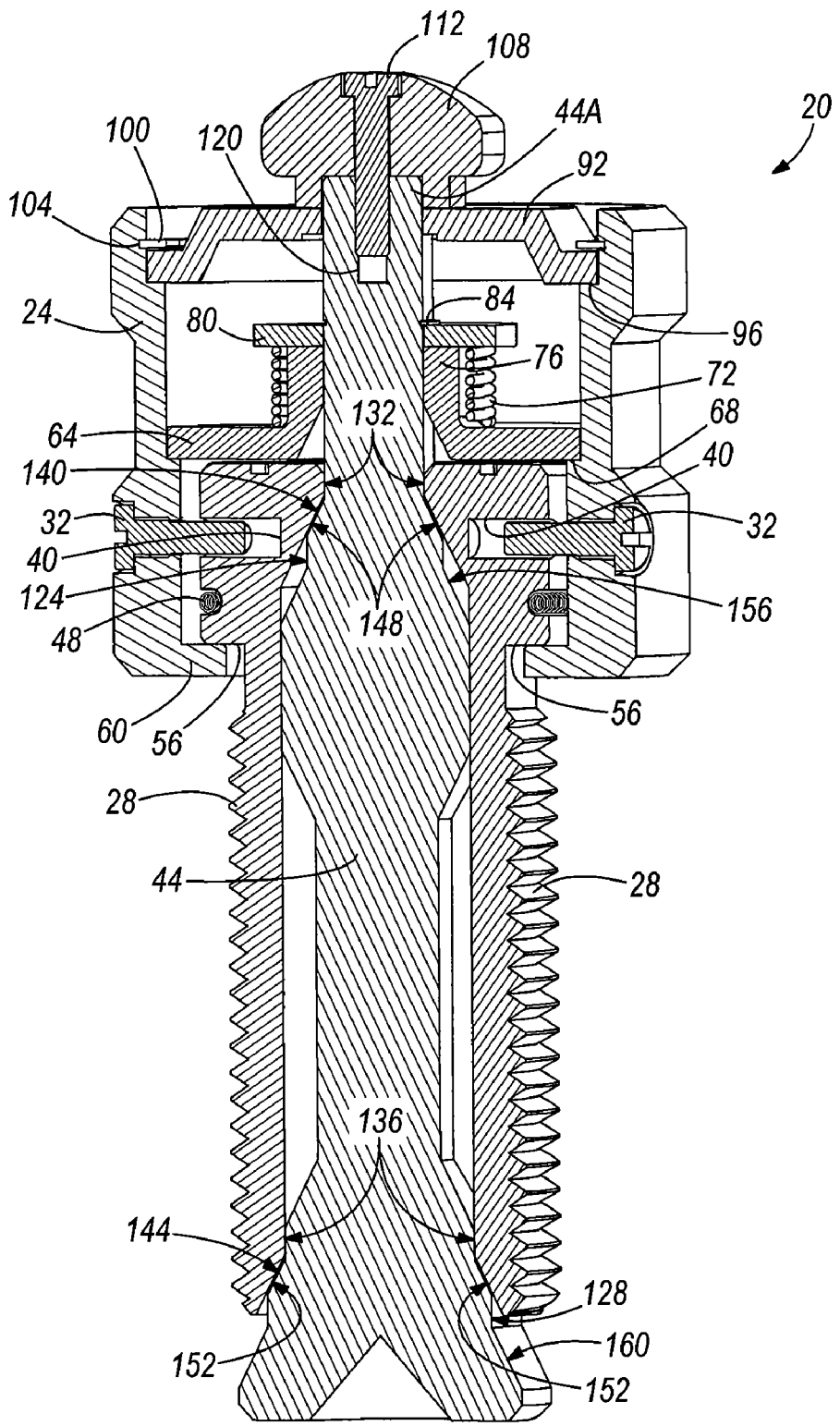
FIG. 9 is a cross-sectional view of the threaded fastener, taken along line 9-9 of FIG. 7.

An inner body 44 is positioned substantially inside the plurality of threaded segments 28. The inner body 44, as discussed in further detail below, radially supports the plurality of threaded segments 28 at all times. As shown in FIGS. 4, 8, and 9, a biasing member 48 biases the plurality of threaded segments 28 radially inward toward the axis A and into contact with the inner body 44. As described in further detail below, the inner body 44 is provided with a plurality of external surfaces for contacting and supporting the plurality of threaded segments 28.

In the illustrated construction, the biasing member 48 is a single garter spring that extends circumferentially around the outside of the plurality of threaded segments 28. In the illustrated construction, each of the plurality of threaded segments 28 is provided with a circumferentially extending groove segment 52 for retaining the biasing member 48. Although other placements are optional, the groove segments 52 are positioned adjacent the clearance holes 40 (just below the clearance holes 40 as viewed in FIG. 4). The use of a single biasing member 48 provides for minimal number of parts and ease of assembly. In alternate constructions, individual biasing members may be provided in addition to or instead of the single circumferentially extending biasing member 48. For example, individual biasing members can be placed radially between the outside of each respective threaded segment 28 and the inside of the outer body 24 (e.g., adjacent to or on the respective pins 32).

Assembly of the fastener 20 is relatively easy. The threaded segments 28 are placed onto the inner body 44 and the biasing member 48 is positioned around them. As shown in FIGS. 8 and 9, each of the plurality of threaded segments 28 is inserted into the outer body 24 until a shoulder 56 of each of the plurality of threaded segments 28 abuts a radially inwardly extending lip 60 of the outer body 24. The pins 32 can then be inserted to engage the threaded apertures 36 in the outer body 24 and the clearance holes 40 in the threaded segments 28. A disc-shaped collar 64 is placed into the outer body 24 (generally atop the threaded segments 28 as viewed in FIGS. 8 and 9) until it abuts a shoulder 68 on the interior of the outer body 24. A second biasing member 72 is positioned on a cylindrically shaped protrusion 76 of the collar 64. The protrusion 76 axially centers the second biasing member 72, which is an axially oriented coil spring in the illustrated construction.

A washer 80 is placed over the inner body 44 to contact the second biasing member 72. A retaining ring 84 is coupled with a ring groove 88 in the inner body 44 to axially retain the washer 80 in position so that the inner body 44 can be axially biased relative to the outer body 24 and the threaded segments 28 by the second biasing member 72 as described in further detail below. A cap 92 is placed over the inner body 44 until it abuts a shoulder 96 on the interior of the outer body 24. A retaining ring 100 is coupled with a ring groove 104 in the outer body 24 to axially retain the cap 92. A button 108 is coupled to the end 44A of the inner body 44 that is exposed through the cap 92. In the illustrated construction, the button 108 is coupled to the inner body 44 by a threaded fastener 112 that extends axially through an aperture 116 in the button 108 and into a threaded aperture 120 in the end of the inner body 44. Thus, the assembly of the fastener 20 requires mostly straightforward axial stacking of components into the outer body 24 and requires no particularly complex operations or specialized tools.

At rest, the fastener 20 assumes the condition of FIGS. 1-3, in which the threaded segments 28 define the nominal diameter D1 and a consistent pitch is defined by the threads of adjacent threaded segments 28 (albeit with gaps G therebetween). In order to collapse or retract the threaded portion of the fastener 20 from the condition of FIGS. 1-3 to that of FIGS. 5-7, the button 108 is axially depressed against a bias force of the second bias member 72 while the outer body 24 is held stationary. Axial movement of the inner body 44 moves a pair of abutment surfaces 124, 128 of the inner body 44 out of engagement with the interior of the threaded segments 28. The abutment surfaces 124, 128 of the inner body 44 are substantially cylindrical so that they extend substantially parallel to the axis A. In the illustrated construction, the abutment surfaces 124, 128 are axially spaced-apart to generally correspond to the proximal and distal ends of the threaded segments 28 ("proximal" and "distal" being referenced with respect to the outer body 24). Corresponding abutment surfaces 132, 136 are provided on the interior of the threaded segments 28 and are also substantially cylindrical so that they extend substantially parallel to the axis A.

When the fastener 20 is at rest, the second biasing member 72 biases the inner body 44 to a first position (the position of FIGS. 1-3 and 8) and the first biasing member 48 biases the abutment surfaces 132, 136 of the threaded segments 28 into engagement with the abutment surfaces 124, 128 of the inner body 44. In this state, the threaded segments 28 cannot be retracted or collapsed to the second diameter D2 by applying a radially compressive or "squeezing" force directly on the threaded segments 28. Thus, the inner body 44 (and specifically the abutment surfaces 124, 128 that radially support and block inward movement of the threaded segments 28) provides a blocking feature that positively blocks incidental retraction of the threaded segments 28. The threaded segments 28 can only be retracted to the second diameter D2 when the button 108 is depressed to axially move the inner body 44 from the first position (FIG. 8) to the second position (FIG. 9).

When the button 108 is depressed to axially move the inner body 44 to the second position, the abutment surfaces 124, 128 of the inner body 44 slide out of engagement with the abutment surfaces 132, 136 of the threaded segments 28 so that the inner body 44 no longer blocks the radial retraction of the threaded segments 28. At the same time, tapered engagement surfaces 140, 144 of the inner body 44 are moved into engagement with tapered engagement surfaces 148, 152 of the threaded segments 28 as the biasing member 48 biases the threaded segments 28 radially inward. Each of the tapered engagement surfaces 140, 144 of the inner body 44 is positioned adjacent one of the abutment surfaces 124, 128, on the side closer to the "actuated end" 44A of the inner body 44. In the illustrated construction, the tapered engagement surfaces 140, 144 on the inner body 44 are generally frusto-conically shaped, and the tapered engagement surfaces 148, 152 on the inside of the threaded segments 28 collectively define a generally frusto-conical shaped void for receiving the inner body 44. The tapered engagement surfaces 148, 152 contact tapered resting surfaces 156, 160 of the inner body 44 when the inner body 44 is in the first position (i.e., the fastener 20 is in the at-rest state of FIGS. 1-3).

Figure 10A:
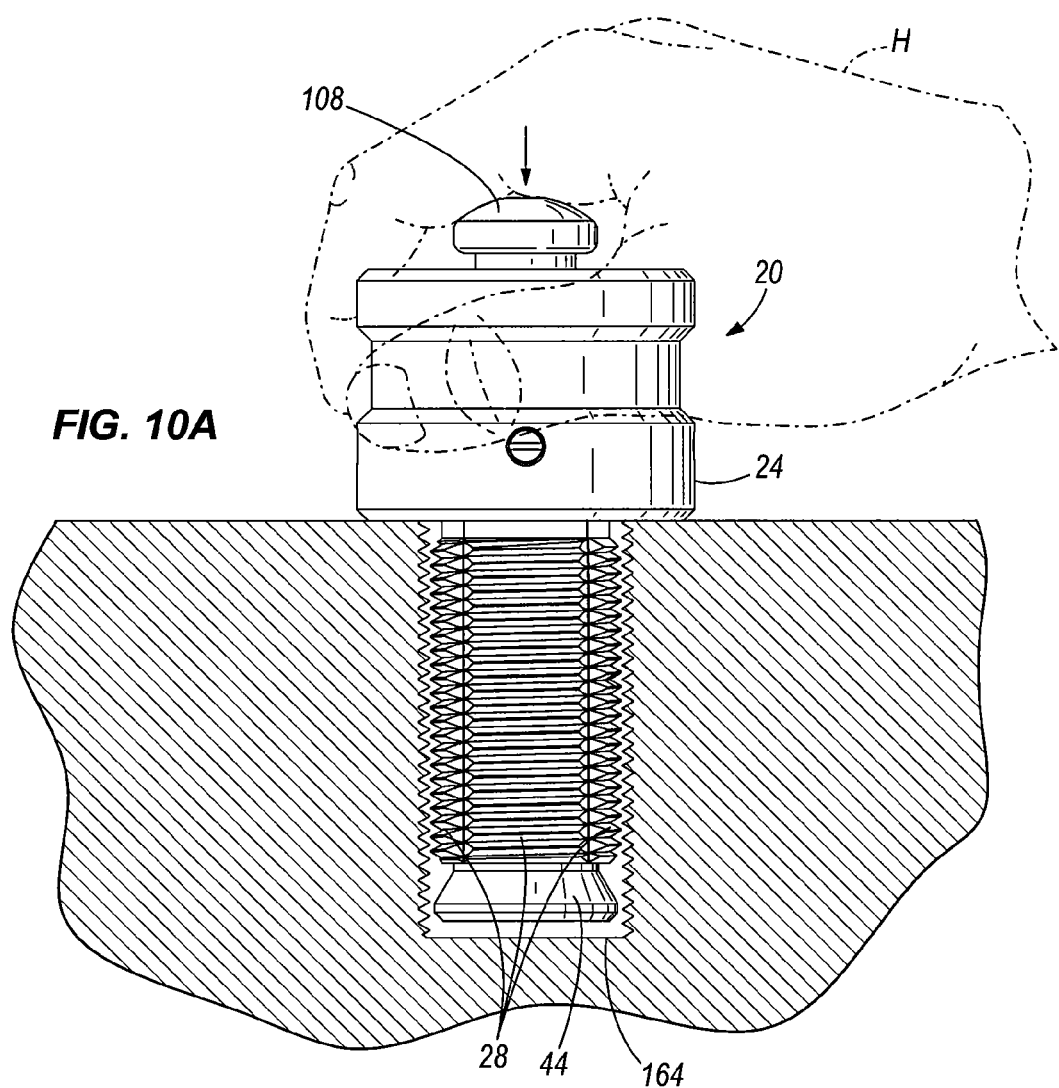
FIG. 10A is a front view of the threaded fastener of FIG. 1 being collapsed and inserted by a user into a threaded receiver.

When the button 108 is depressed to retract the threaded segments 28 to the second diameter D2, the threaded portion of the fastener 20 can be freely axially inserted without rotation into a threaded opening 164 (FIG. 10A) that corresponds to (i.e., has the same nominal size and thread configuration as) the at-rest threaded segments 28. FIG. 10A illustrates one manner in which a user may use his or her hand H to grasp the fastener 20 and actuate the button 108 to retract or collapse the threaded segments 28. Alternate means, utilizing one or more hands, may alternately be employed.

Figure 10B:
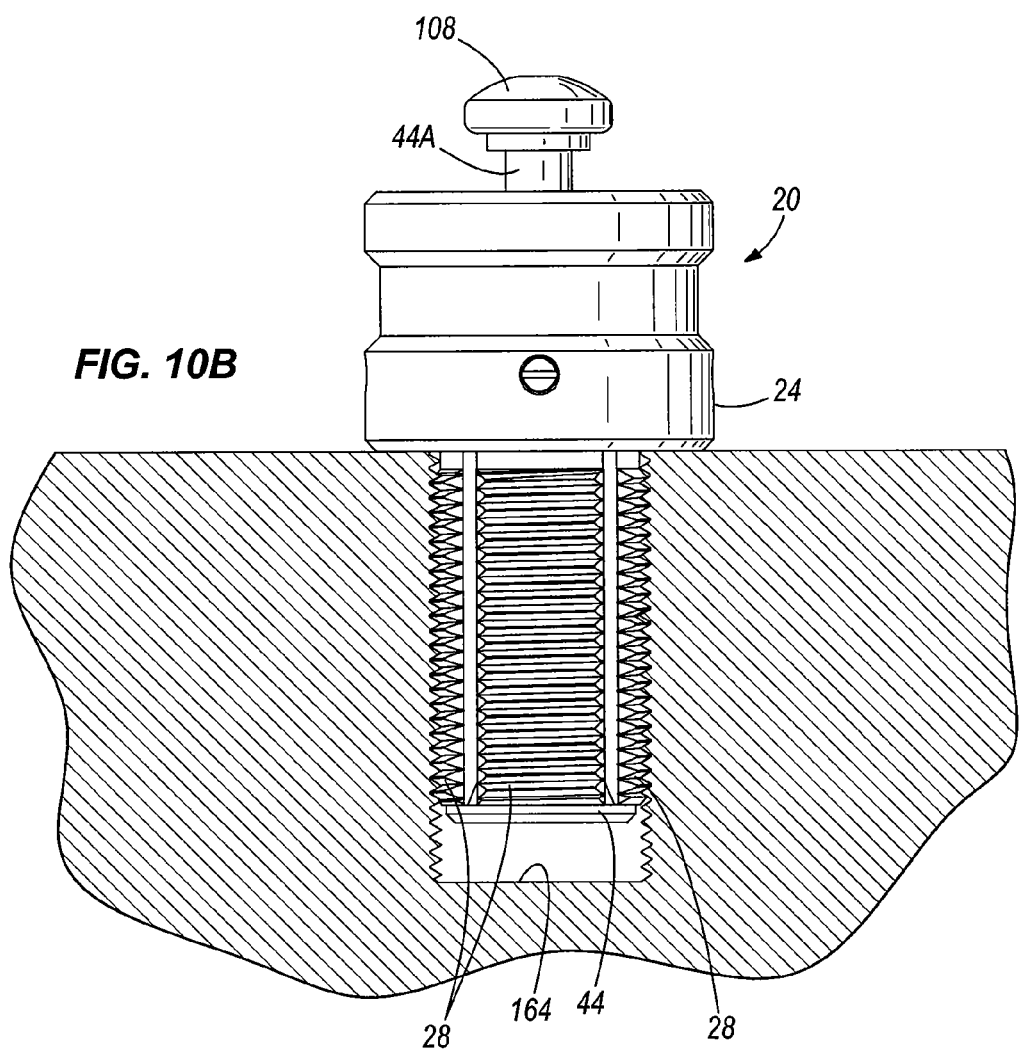
FIG. 10B is a front view of the threaded fastener of FIG. 1 engaged with the threaded receiver of FIG. 10A.
Figure 11:
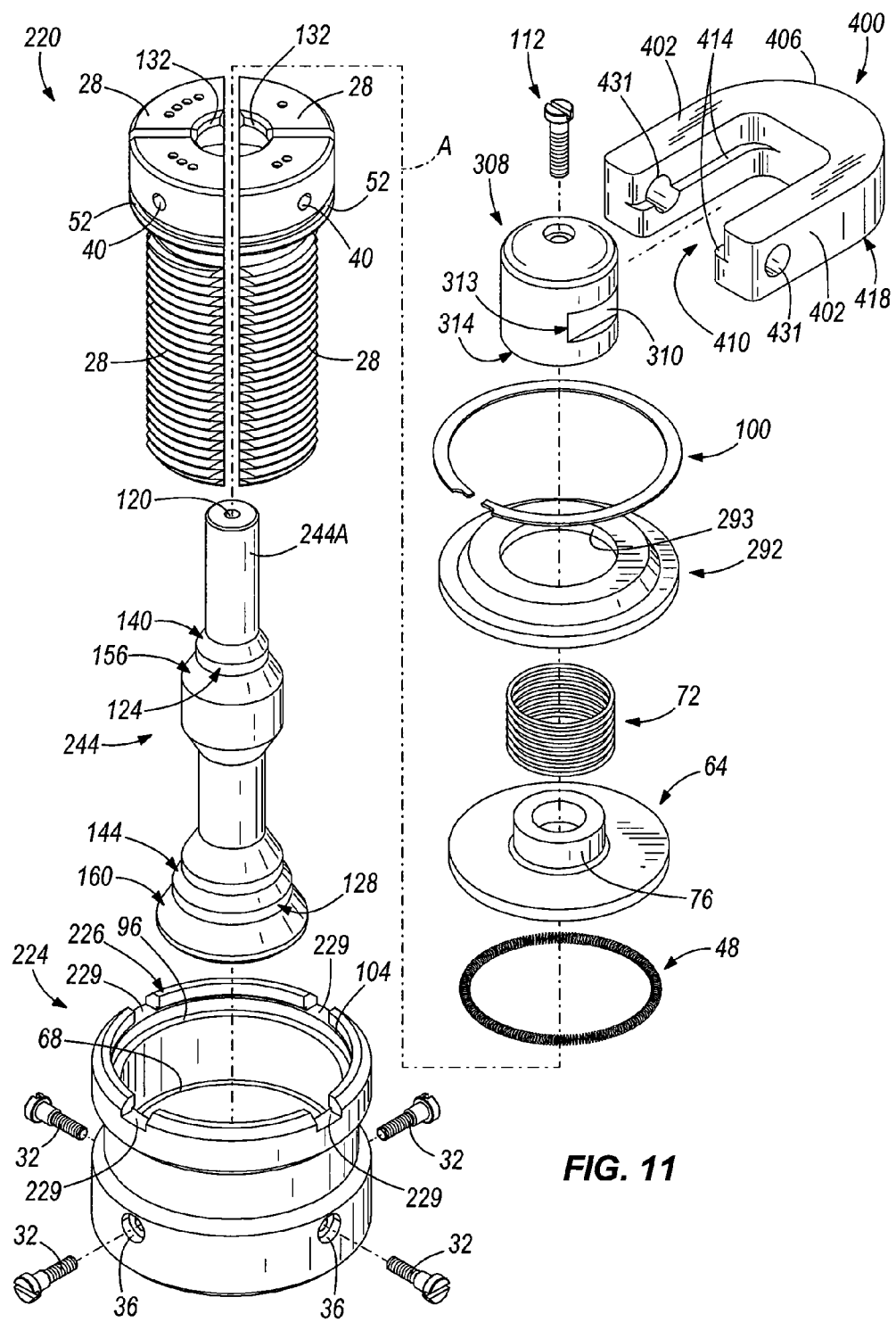
FIG. 11 is an exploded assembly view of a threaded fastener incorporating a locking member.
Figure 12:
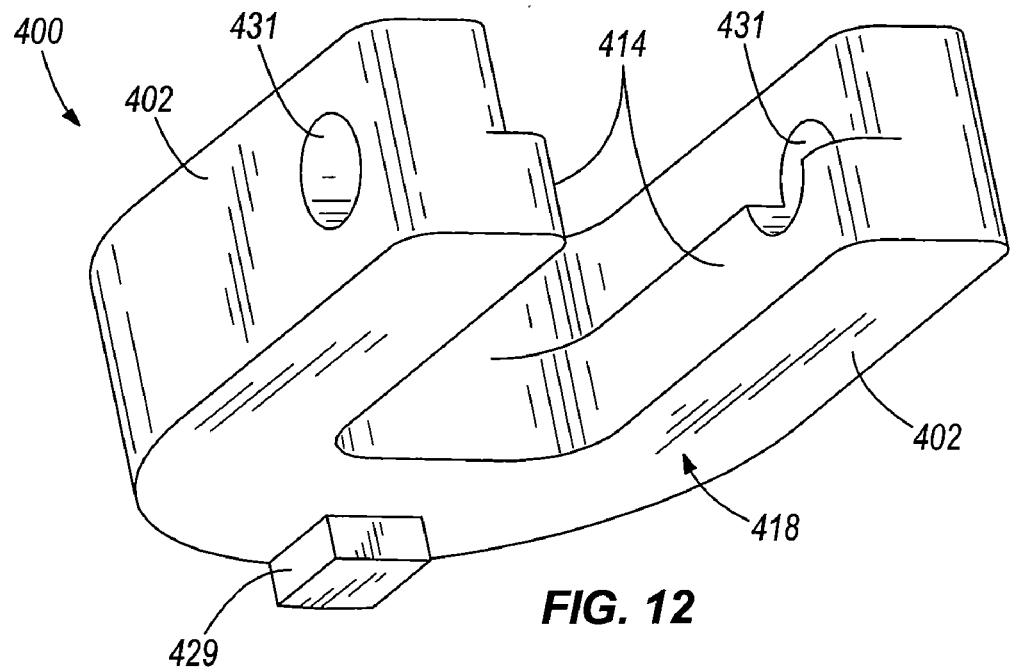
FIG. 12 is a perspective view of the locking member of FIG. 11.
Figure 13:
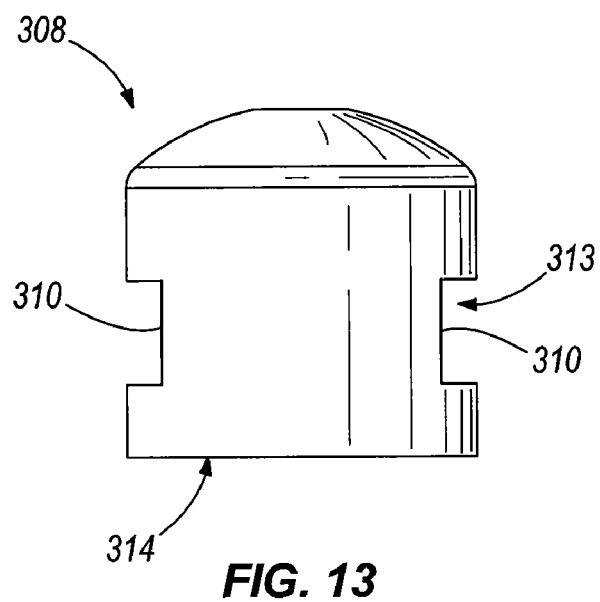
FIG. 13 is a front view of an actuating button of the fastener of FIG. 11.
Figure 14:
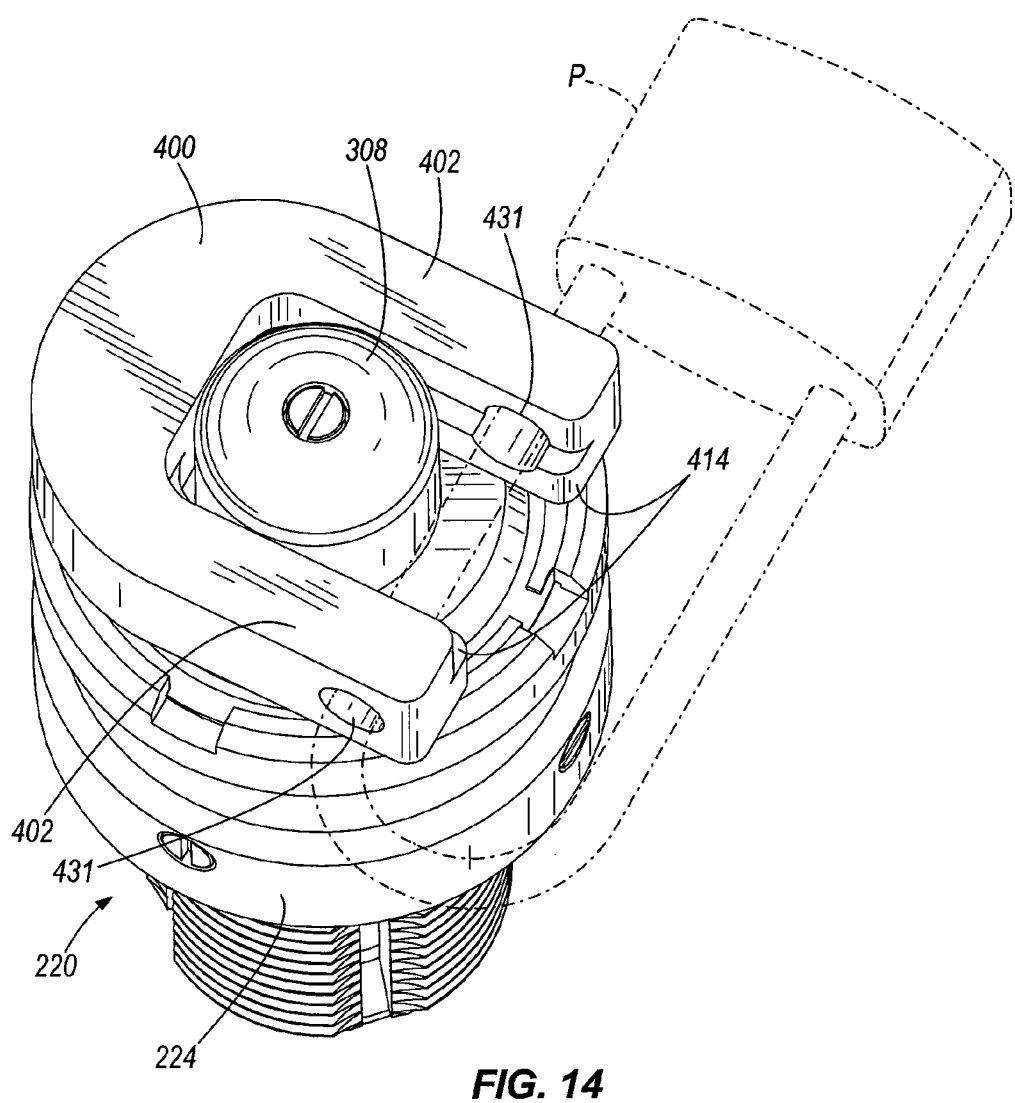
FIG. 14 is a perspective view of the fastener of FIG. 11, with the locking member applied.

As shown in FIG. 10B, the user releases the button 108 when the fastener 20 is in the desired depth within the threaded opening 164. The inner body 44 is biased by the second biasing member 72 back to the first position, which forces the threaded segments 28 back to the nominal diameter D1 so that the threads of the threaded segments 28 instantly engage the threaded opening 164. Axial movement of the inner body 44 driven by the second biasing member 72 initiates sliding contact between the respective tapered engagement surfaces 140, 144 and 148, 152. The bias force of the second biasing member 72 is substantially greater than the biasing force of the first biasing member 48 and is great enough to re-establish contact between the respective abutment surfaces 124, 128 and 132, 136 of the inner body 44 and the threaded segments 28. Although not shown, the fastener 20 can be used with a nut, in which case the fastener 20 may be held still while the nut is freely slid axially onto the threaded portion without the need for rotation.

FIGS. 11-14 illustrate a fastener 220 that is identical in most respects to the fastener 20 of FIGS. 1-10B. Therefore, the description of the fastener 220 provided below is mainly focused on those features that are different from the fastener 20 of FIGS. 1-10B, and reference is made to the above description of the fastener 20 of FIGS. 1-10B in all other respects. Reference numbers from FIGS. 1-10B are re-used where appropriate.

The fastener 220 of FIGS. 11-14 includes a cap 292 having an enlarged central aperture 293 compared to the cap 92 of the fastener 20. The central aperture 293 is sized to allow passage of a button 308 therethrough. The button 308 is similar to the button 108 of the fastener 20 in that the button 308 is coupled to the actuated end 244A of the inner body 244 and used to actuate the fastener 220 (i.e., to retract or collapse the threaded segments 28). However, the button 308 of the fastener 220 has an increased axial length compared to the button 108 and is provided with a substantially uniform exterior surface along its length, except for two opposed notches or flats 310. The flats 310 are substantially parallel with each other and define two planes that are substantially parallel to the axis A and equidistant from it. The flats 310 effectively define a neck portion 313 of the button 308 having a reduced dimension (perpendicular to the axis A) compared to the remainder of the button 308.

Unlike the fastener 20 of FIGS. 1-10B, in which the biasing member 72 is acted upon through the washer 80 and the retaining ring 84, the biasing member 72 of the fastener 220 is acted upon directly by an end face 314 of the button 308 since the button 308 is able to extend through the cap 292 when actuated. This allows the elimination of the washer 80, the retaining ring 84, and the ring groove 88. Thus, this feature alone, irrespective of any of the other features present in the fastener 220, may be advantageously incorporated into the fastener 20 of FIGS. 1-10B.

The button 308 and the outer body 224 of the fastener 220 are configured to receive a locking member 400. When applied, the locking member 400 blocks the axial movement of the button 308 and the inner body 244 required to retract or collapse the threaded segments 28. The locking member 400 is generally U-shaped or fork-shaped with two parallel legs 402, one closed end 406, and one open end 410. Internal lips or rims 414 extend inwardly toward each other from each of the legs 402. The internal rims 414 are configured to fit into the notches or flats 310 of the button 308, and an end face 418 of the locking member 400 is configured to abut an end face 226 of the outer body 224 to prevent axial movement of the button 308 and the inner body 244 relative to the outer body 224. Since the inner body 244 cannot be moved relative to the threaded segments 28 to remove the abutment surfaces 124, 128 of the inner body 244 from blocking the abutment surfaces 132, 136 of the threaded segments 28, the locking member 400 is effective to selectively prevent actuation of the fastener 220 so that the threaded segments 28 are not retracted or collapsed.

The locking member 400 is further engageable with the outer body 224 to prevent or inhibit relative rotation about the axis A. A detent structure is provided between the locking member 400 and the outer body 224 to maintain a predetermined orientation therebetween. In the illustrated construction, the detent structure includes a plurality of recesses 229 formed in the end face 226 of the outer body 224 and a tab or protrusion 429 extending from the end face 418 of the locking member 400. The outer body 224 includes four recesses 229 in the illustrated construction. To apply the locking member 400, the internal rims 414 are aligned with the notches or flats 310 and the locking member 400 is slid substantially perpendicular to the axis A to engage the rims 414 with the notches or flats 310. Then a slight rotation of the locking member 400 may be required to align the protrusion 429 of the locking member 400 with one of the recesses 229 in the outer body 224. Thus engaged, removal of the locking member 400 can be prevented or inhibited by the insertion of a lock through a pair of aligned apertures 431 in the legs 402 of the locking member 400. A padlock P is illustrated in phantom lines in FIG. 14, although alternate use of the apertures 431 is described below.

Figure 15:
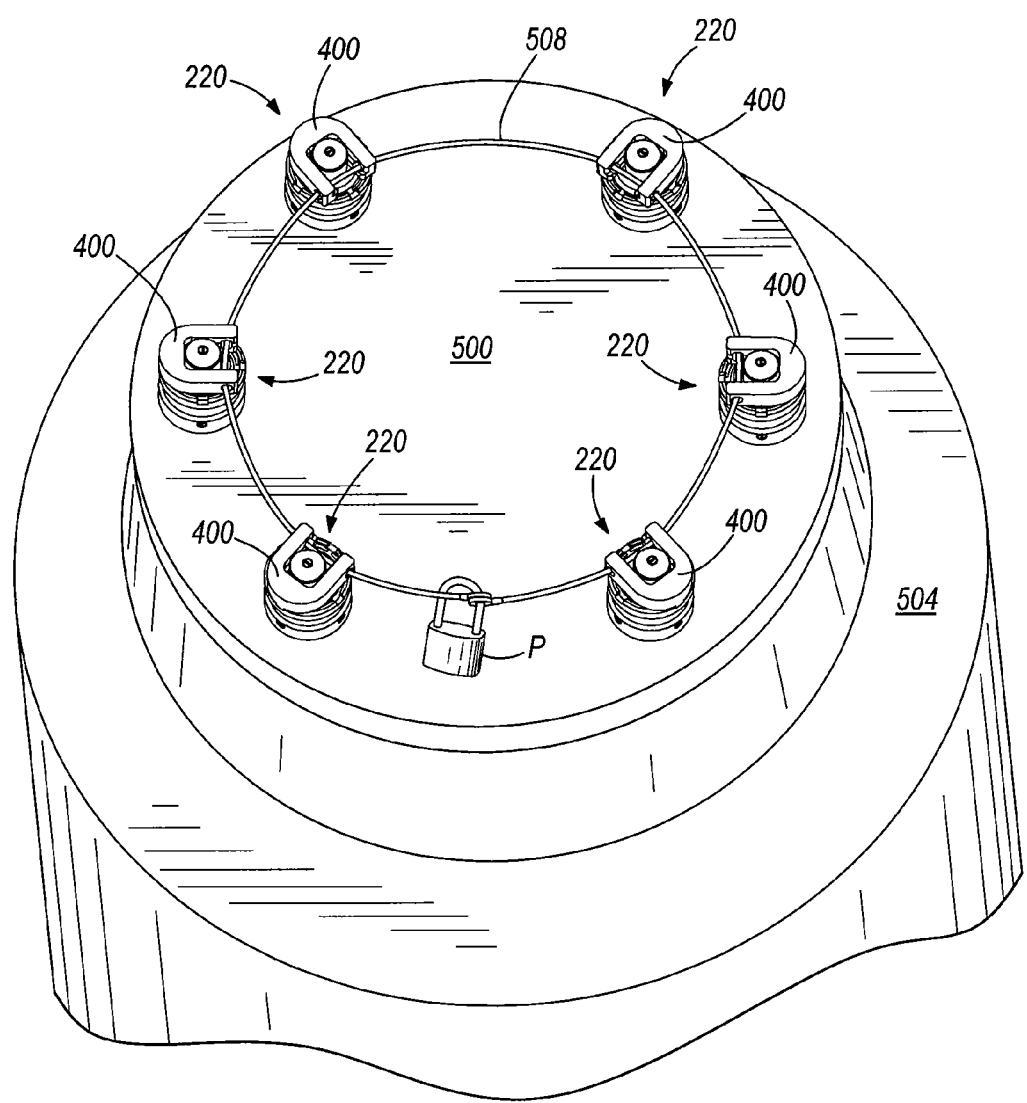
FIG. 15 is a perspective view of a plurality of fasteners as shown in FIG. 11, each with locking members applied, all of which are collectively locked in position.

FIG. 15 illustrates a plurality of the fasteners 220 used to couple an end plate 500 to a vessel 504 in order to close and seal the vessel 504. A locking member 400 is applied to each of the fasteners 220 as described above. A cord or cable lock 508 extends through the apertures 431 of all of the locking members 400 and is locked in place (e.g., using the padlock P). This arrangement prevents or inhibits the removal of any of the locking members 400 from their respective fasteners 220 and further prevents or inhibits conventional removal of any of the fasteners 220 by preventing rotation of any of the fasteners 220 relative to the end plate 500 and vessel 504. A similar practice may be carried out to lock a single fastener 220 against removal from an engaged structure by passing the cable lock 508 through the apertures 431 in a locking member 400 and locking the cable lock 508 to an adjacent stationary structure.

The fasteners 20, 220 described above and illustrated in the drawings are particularly useful in circumstances where speed of assembly and disassembly are of importance for one reason or another. In some cases, the fasteners 20, 220 help reduce workers' exposure to potentially harmful work environments created by radiation, poor air quality, or other dangers. These environments may include, among other things, nuclear power plants, high energy physics laboratories, confined underground spaces, factories with sharp or large moving parts, locations in which explosive devices are utilized or stored, fire/rescue, oil exploration and production, aerospace, medical environments, or at any location that requires work at significant heights above the ground.

Furthermore, the fasteners 20, 220 can improve productivity in tasks that require repeated assembly and disassembly of components such as various test fixtures, work piece holding devices, etc. Where the percentage of overall job time spent on work piece exchange is high, the fasteners 20, 220 offer the greatest potential time savings since the time spent threading and unthreading fasteners can be virtually eliminated. Therefore, productivity can be increased dramatically.

It bears repeating that the fasteners 20, 220 can be made in virtually any size, with any type of threads. Therefore, fasteners similar to the fasteners 20, 220 can be used throughout a particular component, assembly, or job site where many different sizes of fasteners are required. In such instances, the use of the fasteners 20, 220 not only saves time but also reduces the necessity for workers to locate and carry many different tools such as wrenches, sockets, drivers, etc. which would typically be required.

Although not illustrated in the figures, either of the outer bodies 24, 224 disclosed may be provided with a tool-engaging feature such as a hex-shaped boss, two parallel flats, etc. so that a tool (e.g., a wrench) may be engaged with the outer body 24, 224 to apply a specified torque to the fastener 20, 220 that may or may not be able to be applied by hand. Where hand-tightening is sufficient, the outer body 24, 224 of either of the fasteners 20, 220 can be provided with gripping structure to aid a user's grip on the fastener 20, 220. This can include providing one or more knurled surfaces or two or more wing-shaped protrusions, among other things. Furthermore, the fasteners 20, 220 can be manufactured from many different materials, such as aluminum, brass, various forms of steel, titanium, and even plastic, among others.

Thus, the invention provides, among other things, a fast-acting collapsible fastener that is engageable and disengageable with a threaded opening with substantially no rotation and that positively blocks the threaded segments against retraction until a blocking feature is actuated, and that may be configured to be locked to selectively prevent or inhibit actuation of the blocking feature. Various features and advantages of the invention are set forth in the following claims.

What is claimed is:

1. A threaded fastener comprising:
an outer body defining an axis;
an inner body at least partially positioned within the outer body, the inner body being movable along the axis relative to the outer body;
a plurality of male threaded segments coupled to the outer body and radially supported by the inner body, the plurality of male threaded segments defining a nominal diameter; and
at least one biasing member biasing the plurality of male threaded segments inward toward the axis, the plurality of male threaded segments being movable inward toward the axis by the at least one biasing member when the inner body is moved axially from a first position to a second position so that the plurality of male threaded segments define a reduced diameter that is smaller than the nominal diameter,
wherein the inner body includes an exterior surface having a first abutment surface portion that is substantially parallel to the axis and that supports the plurality of male threaded segments when the plurality of male threaded segments are arranged to define the nominal diameter, and
wherein the exterior surface of the inner body includes a first frusto-conical surface portion axially adjacent the first abutment surface portion and tapering radially inwardly from the first abutment surface portion, the first frusto-conical surface portion supporting the plurality of male threaded segments when the plurality of male threaded segments are arranged to define the reduced diameter.

2. The threaded fastener of claim 1, wherein the exterior surface of the inner body includes a second abutment surface portion and a second frusto-conical surface portion, the second abutment surface portion being substantially parallel to the axis and supporting the plurality of male threaded segments when the plurality of male threaded segments are arranged to define the nominal diameter, and the second frusto-conical surface portion supporting the plurality of male threaded segments when the plurality of male threaded segments are arranged to define the reduced diameter.

3. The threaded fastener of claim 1, further comprising a plurality of pins that couple the plurality of male threaded segments to the outer body.

4. The threaded fastener of claim 1, wherein the plurality of male threaded segments includes at least four segments.

5. The threaded fastener of claim 1, wherein the at least one biasing member includes a garter spring that extends around the plurality of threaded segments.

6. The threaded fastener of claim 1, further comprising an axial biasing member biasing the inner body to the first position.

7. The threaded fastener of claim 1, further comprising a locking member configured to be selectively coupled to the inner body to prevent movement of the inner body from the first position to the second position.

8. The threaded fastener of claim 7, wherein the locking member is positively engageable with the outer body to inhibit rotation of the locking member with respect to the outer body.

9. A threaded fastener comprising:
a plurality of male threaded segments defining an axis and a nominal diameter measured perpendicular to the axis, the plurality of male threaded segments being radially retractable to selectively decrease the effective outer diameter of the threaded fastener from the nominal diameter to a reduced diameter that is smaller than the nominal diameter; and
a blocking feature movable between a blocking position in which the blocking feature blocks the refraction of the plurality of male threaded segments and a non-blocking position which allows the retraction of the plurality of male threaded segments, wherein the blocking feature is biased to the blocking position.

10. The threaded fastener of claim 9, wherein the blocking feature is formed on an inner body that is positioned radially within the plurality of male threaded segments.

11. The threaded fastener of claim 10, wherein the blocking feature includes at least one abutment surface that is substantially parallel to the axis.

12. The threaded fastener of claim 11, wherein the blocking feature includes two axially spaced abutment surfaces.

13. The threaded fastener of claim 11, wherein the inner body is axially movable relative to the plurality of male threaded segments to move the at least one abutment surface into and out of blocking engagement with the plurality of male threaded segments.

14. The threaded fastener of claim 13, further comprising a locking member configured to be selectively coupled to the inner body when the at least one abutment surface is in blocking engagement with the plurality of male threaded segments to prevent movement of the at least one abutment surface out of blocking engagement with the plurality of male threaded segments.

15. The threaded fastener of claim 14, further comprising means for inhibiting rotation of the locking member with respect to the plurality of male threaded segments.

16. The threaded fastener of claim 9, further comprising at least one biasing member biasing the plurality of male threaded segments radially inward such that the plurality of male threaded segments are automatically retracted from the nominal diameter to the reduced diameter when the blocking feature is moved to the non-blocking position.

17. A threaded fastener comprising:

an outer body defining an axis;

an inner body at least partially positioned within the outer body, the inner body being movable along the axis relative to the outer body;

a plurality of male threaded segments coupled to the outer body and radially supported by the inner body, the plurality of male threaded segments defining a nominal diameter;

at least one biasing member biasing the plurality of male threaded segments inward toward the axis, the plurality of male threaded segments being movable inward toward the axis by the at least one biasing member when the inner body is moved axially from a first position to a second position so that the plurality of male threaded segments define a reduced diameter that is smaller than the nominal diameter; and an axial biasing member biasing the inner body to the first position.

* * * * *

UNITED STATES PATENT AND TRADEMARK OFFICE
CERTIFICATE OF CORRECTION

| | |
|---|---|
| PATENT NO. | : 8,342,787 B2 |
| APPLICATION NO. | : 12/616221 |
| DATED | : January 1, 2013 |
| INVENTOR(S) | : Dwight Smith |

Page 1 of 1

It is certified that error appears in the above-identified patent and that said Letters Patent is hereby corrected as shown below:

In the Claims:

Col. 8, line 65 of claim 9: Replace the word [refraction] with --retraction--

Signed and Sealed this
Fourth Day of June, 2013

Teresa Stanek Rea
*Acting Director of the United States Patent and Trademark Office*